UNITED STATES PATENT OFFICE.

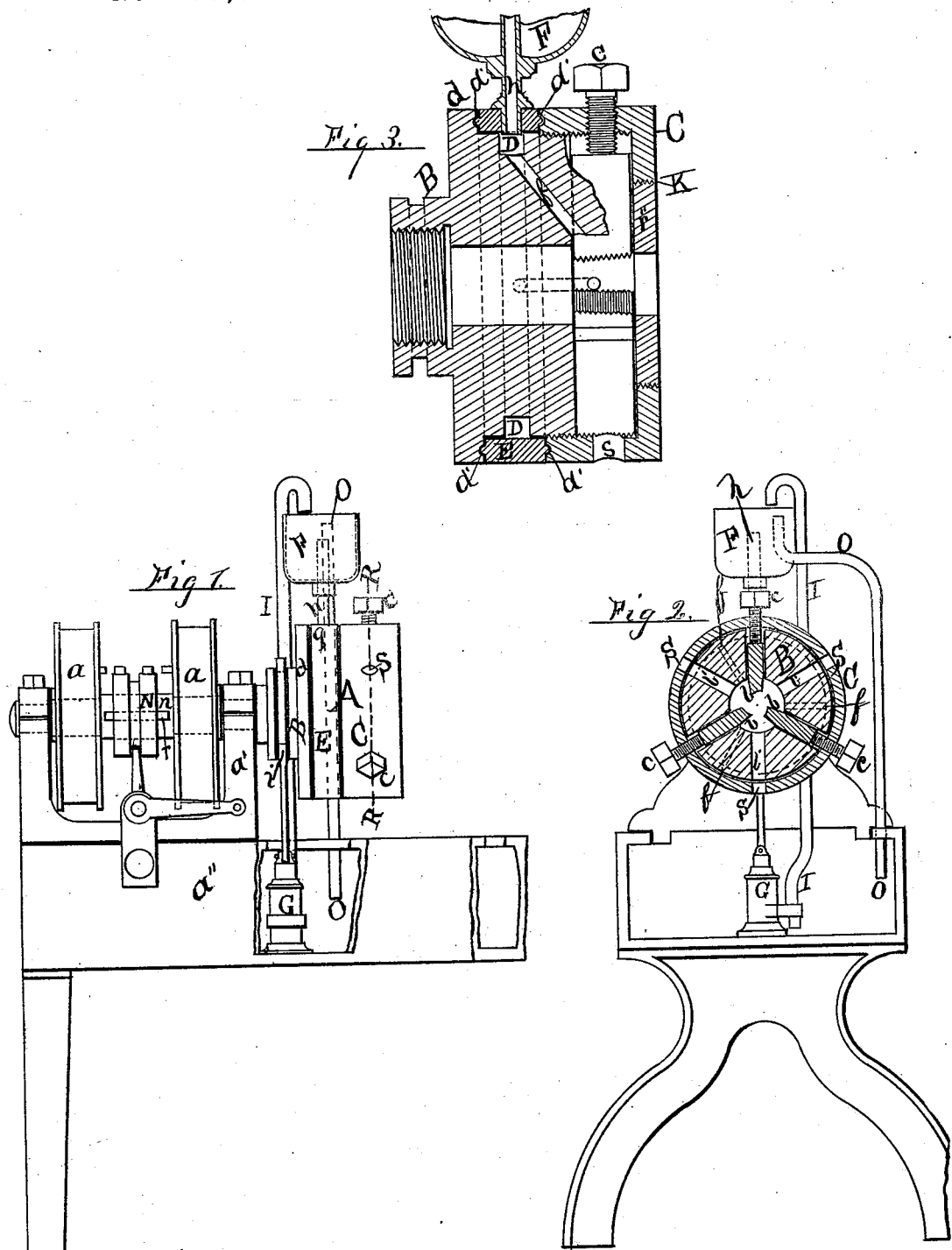

LYMAN FIELD, OF MEDINA, NEW YORK.

IMPROVEMENT IN SCREW-CUTTING MACHINES.

Specification forming part of Letters Patent No. 194,962, dated September 11, 1877; application filed July 14, 1877.

*To all whom it may concern:*

Be it known that I, LYMAN FIELD, of Medina, county of Orleans, and State of New York, have invented a new and useful Improvement in Screw-Cutting Chucks, which improvement is fully set forth in the following specification and accompanying drawings, in which—

Figure 1 is a side elevation. Fig. 2 is a front elevation, showing a section through line R R on Fig. 1; and Fig. 3 is a longitudinal section of the same.

The corresponding parts of each view are designated by corresponding letters.

The object of my invention is to produce a screw-cutting machine or chuck, for cutting bolts or screws of all kinds. It is especially adapted for work where large numbers, of certain sizes, are required. It is not for cutting the threads alone for which its usefulness has been demonstrated, but also for turning and pointing the iron before cutting the screw.

What I consider as new in my machine is the chuck A and an oil-pump, G, for the purpose of supplying oil to the dies in the chuck A.

Fig. 1 shows my chuck attached to a spindle, $n$, which is rotated in either direction by the pulleys $a$ $a$, which run loose on the spindle, communicating their motion through the clutch-coupling N, which has an endwise motion, sliding on the feather-key $r$.

The head-block $a'$, in which the spindle revolves, is secured to a box-frame, $a''$.

The chuck A, as a whole, is composed of several parts, so I will designate the largest part, or the piece that screws on the lathe-spindle, by B. This piece B has in its outer face three slots, about three-quarters of an inch wide and two inches deep, cut equally distant from each other, and extending from the outer circumference to the center, or into a recess bored into the center. These slots receive the dies $b$ $b$ $b$ for cutting threads or the tools for turning and pointing. There are also three other slots, $b'$ $b'$ $b'$, cut in the same face, not as large, however, and equidistant between the slots containing the dies $b$ $b$ $b$, so that they would alternate thus, $b'$ $b$ $b'$ $b$ $b'$ $b$.

The object of the slots $b'$ $b'$ $b'$ is to afford an exit for the chips, &c., from the dies.

A follower, C, is bored and threaded in its internal diameter to fit the outer diameter of the piece B, and when screwed on the side of the follower C closes the open side of the slots and retains the dies $b$ $b$ $b$ in position. A hole is drilled through the follower C, directly over the end of each of the dies $b$ $b$ $b$, to receive the screws $c$ $c$ $c$, which project downward and force the dies to any required position. The follower prevents the dies moving from the bolts; hence the dies may be adjusted to any size of iron by the screws $c$ $c$ $c$.

The side of the piece B next the head-block is flanged at $d$, said flange projecting about one inch, and when the follower C is screwed up to its position there is a space between the flange $d$ and the follower C of about two inches. This space is filled by the ring or band E. This ring may be made of cast-iron, brass, or any other metal desired; but I prefer to make it in the following manner: After the follower C has been fitted to the piece B, I cut a half-round groove, $d'$ $d'$, on the inner edges of the flange $d$ and the follower C; then cover in the space outside of both. I cast a Babbitt-metal ring, E, in the space. The ring made in this manner will fit exactly. Then I remove the follower C and ring E, and turn in the piece B the groove D, about one inch wide and one inch deep. From this groove I drill three holes, about three-eighths of an inch in diameter. (Shown at $f$ $f$ $f$.) On Fig. 2 these holes $f$ $f$ $f$ extend from the groove D toward the center and outward, terminating directly over the cutting-edge of the die or turning-tool, one opening over each die or tool, as shown on Fig. 2. The direction of the hole $f$ is shown in Fig. 3. The ring is (when the chuck is in motion) retained in position, or it is not allowed to revolve with the chuck. On the upper side, at $g$, is a tube, $h$, which projects through and into the groove D at one end, and upward through the reservoir F at the other end, as shown by all the views.

The box-frame $a''$, to which the head-block $a'$ is secured, forms a reservoir for oil, which is transmitted from there into the upper reservoir F by means of a small piston-pump, G, of sufficient capacity to supply more oil than the dies require. When in use it is secured on the inside of the frame $a''$, directly under the chuck, and is worked by the eccentric $i$ on the hub of the chuck. When the chuck is in motion the pump G, being submerged in the oil, is sure to work, and discharges the oil through the pipe I, which rises upward and terminates over the top of the upper reservoir F. When this has filled to the top of the tube $h$ the oil will pass down through that tube into the groove D; from thence, through the holes $fff$, onto the cutting-edges of the dies or turning-tools $b\ b\ b$. The surplus oil passes back into the lower reservoir through the pipe O, which projects above the tube $h$, and will take the oil away from the reservoir before it can overflow. This pipe O, being firmly secured to the reservoir F and to the frame $a''$, prevents the ring E from revolving with the chuck. In the face of the follower C, at K, I screw the cast-steel plate or bushing $r''$, having in its center a hole the size of the iron I wish to cut. I have one of these plates for each size of screw. When the chuck is in operation the openings are all closed except the three holes $s\ s\ s$, which are drilled through the follower C, directly over the slots $b'\ b'\ b'$. These holes $s\ s\ s$ are to allow the chips and oil to pass out and away from the dies. The chuck is internally flooded with oil all the time it is in use.

By this device I am enabled, first, to place the oil just where it is most necessary, and in such quantities that the dies or tools cannot heat; second, I am enabled to run the chuck a great deal faster than any other chuck made; third, the dies or tools will last longer, and will cut twice the number of bolts without sharpening.

Having thus described my invention, what I claim as new, and desire to secure by Letters Patent, is—

The ring or band E, the groove D, and holes $fff$, in combination with the chuck B C and cutters $b$, substantially as shown and described.

LYMAN FIELD.

Witnesses:
GEORGE S. NEWELL,
MYRON S. NEWELL.